United States Patent [19]

Yuki et al.

[11] Patent Number: 4,491,918

[45] Date of Patent: Jan. 1, 1985

[54] METHOD AND SYSTEM FOR HORIZONTALLY CONTROLLING A FORK FOR A FORK LIFT TRUCK

[75] Inventors: Katsumi Yuki, Toyota; Susumu Yoshida, Aichi; Mineo Ozeki, Ichinomiya; Yasuyuki Miyazaki, Aichi; Masaru Kawamata, Numazu, all of Japan

[73] Assignees: Kabushiki Kaisha Toyoda Jidoh Shokki Seisakusho, Kariya; Kabushiki Kaisha Meidensha, Tokyo, both of Japan

[21] Appl. No.: 364,400

[22] Filed: Mar. 31, 1982

[30] Foreign Application Priority Data

| Mar. 31, 1981 | [JP] | Japan | 56-47741 |
| Mar. 31, 1981 | [JP] | Japan | 56-45961[U] |
| Mar. 31, 1981 | [JP] | Japan | 56-45962[U] |

[51] Int. Cl.³ .................. B66F 9/06; G06F 15/50
[52] U.S. Cl. .................... 364/424; 414/273; 414/636
[58] Field of Search .......... 364/424, 478, 559; 340/686; 414/272, 273, 274, 275, 674, 632–638; 371/25; 187/29 R, 29 A

[56] References Cited

U.S. PATENT DOCUMENTS

| 3,993,166 | 11/1976 | Senour | 414/674 |
| 4,068,773 | 1/1978 | Downing et al. | 414/636 |
| 4,168,934 | 9/1979 | Downing et al. | 414/636 |
| 4,411,577 | 10/1983 | Shearer, Jr. | 414/273 |
| 4,411,582 | 10/1983 | Nakada | 414/636 |
| 4,412,327 | 10/1983 | Fox et al. | 371/25 |

Primary Examiner—Gary Chin
Attorney, Agent, or Firm—Lowe, King, Price and Becker

[57] ABSTRACT

A method and system for horizontally controlling a fork for a fork lift truck to be positioned at a position parallel with respect to the ground, according to the loads mounted on the fork. The target backward tilting angle of the upright is previously determined as a function of the load on the fork and stored in a memory of a microcomputer. Therefore, the microcomputer outputs an upright forward/backward tilting operation command signals to a tilt servo mechanism on the basis of signals outputted from a load sensor and a potentiometer to detect upright tilt angles. The tilt servo mechanism according to the present invention can adjust and stop the upright at a target backward tilting angle at a low speed without applying a shock to the load.

12 Claims, 15 Drawing Figures

FIG.14

|      | E | D | C | B | A |
|------|---|---|---|---|---|
| REF1 | 0 | 0 | 0 | 0 | 0 |
| REF2 | 0 | 0 | 0 | 0 | 1 |
| REF3 | 0 | 0 | 0 | 1 | 1 |
| REF4 | 0 | 0 | 1 | 1 | 1 |
| REF5 | 0 | 1 | 1 | 1 | 1 |
| REF6 | 1 | 1 | 1 | 1 | 1 |

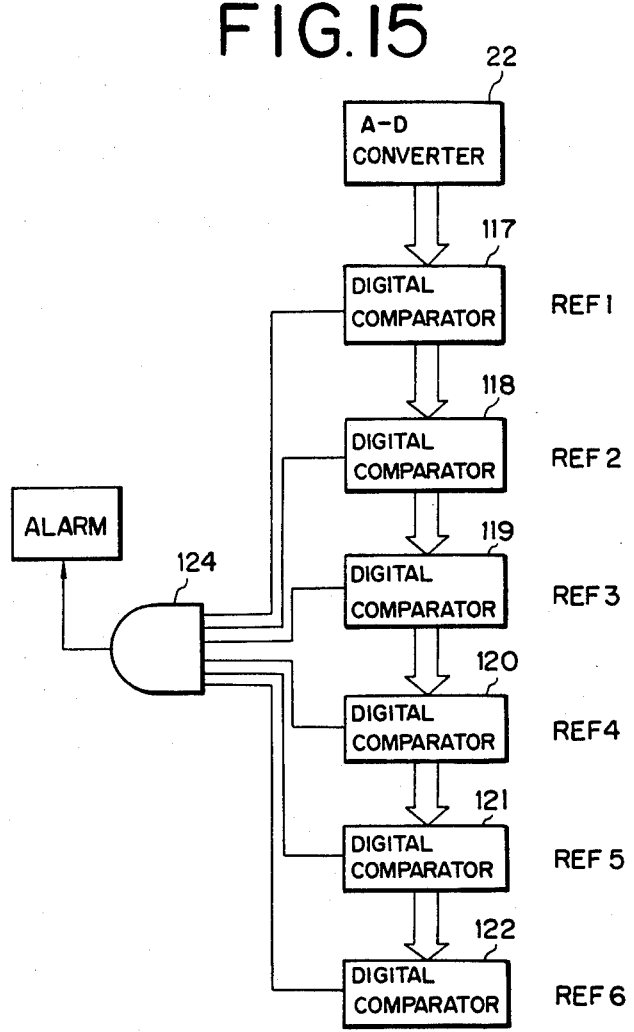

4,491,918

METHOD AND SYSTEM FOR HORIZONTALLY CONTROLLING A FORK FOR A FORK LIFT TRUCK

BACKGROUND OF THE INVENTION

1. Field of the Invention

The present invention relates generally to a method and a system for controlling a vertically movable fork supported by the upright of a fork lift truck at a position parallel with respect to the ground, by the aid of a microcomputer, and more specifically to a method and a system for adjusting the backward tilting angle of the upright (masts) so that the fork is always positioned at a position parallel with respect to the ground even when the load mounted on the fork changes.

2. Description of the Prior Art

An automatic lift operation of a fork lift truck has been proposed by using a microcomputer. In this case, the automatic lift operation is carried out by outputting a number of operation command signals from the microcomputer on the basis of comparison of the current fork lifting height detected by a lift sensor with the reference fork lifting height previously stored in a microcomputer.

When a fork lift truck is used for lifting a load, the lifting height is important. This lifting height is usually obtained by detecting the travel distance of a chain or the number of revolutions of a chain wheel.

In this case, if the fork is accurately positioned at a position parallel with respect to the ground, the lifting height between the fork horizontal portion and the ground is constant everywhere throughout the fork horizontal portion; however, if the upright tilts forwardly or backwardly and therefore the fork is not positioned parallel with respect to the ground, the lifting height at the free end of the fork horizontal portion is not equal to that at the fixed end of the horizontal portion of the fork which is calculated on the basis of travel distance of the chain.

To overcome this problem, therefore, in the usual automatic lifting operation of the fork lift truck, the upright by which the fork is supported movably up and down is first adjusted vertically to the ground. However, in the case where some load is applied onto the fork, there exists a problem in that the fork is tilted forwardly and, additionally, the forward tilting angle varies according to the degree of load. This is because the load on the fork will deform the front wheels, the mast, the fork horizontal portion, etc.

Furthermore, in the usual automatic upright vertically controlling operation of the fork lift truck, since the upright is usually stopped abruptly at its vertical position with respect to the ground, there further exists another problem in that a shock is applied to the load mounted on the fork and thereby there is created a danger that the load may be moved or thrown off the fork, whenever the upright is stopped abruptly.

Furthermore, if an electric failure occurs in the analog-to-digital converter or in a potentiometer for detecting the fork tilt angles, a bit error is produced within any of the output bit strings from the analog-to-digital converter to be fed into the microcomputer. Consequently, since the microcomputer performs the feedback control for the tilt cylinder on the basis of the erroneous bit strings, the upright is tilted at an erroneous angle different from the target value described above so that, e.g., the loads are not properly arranged on the fork and accordingly an accident may occur due to improper arrangement of the loads.

The more detailed description of the prior-art fork lift truck will be made hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide a method and system for controlling a fork movably and vertically supported by the upright of a fork lift truck to be arranged at a position parallel with respect to the ground under any loaded conditions on the basis of the operations executed by a microcomputer.

It is another object of the present invention to provide a method and system for gently stopping the upright at a position where the fork horizontal portion is parallel with respect to the ground at relatively slow speed, without applying shock to the load mounted on the fork.

It is yet another object of the present invention to provide a method and system for controlling a fork movably vertically supported by the upright of a fork lift truck at a position parallel with respect to the ground by always providing correct data for the microcomputer.

To achieve the above-mentioned primary object, the method of controlling a fork horizontal portion supported movably by the upright of a fork lift truck at a position parallel with respect to the ground according to loads mounted on the fork according to the present invention comprises the steps of predetermining target upright backward tilting angles to be previously set for keeping the fork horizontal portion at a position parallel with respect to the ground according to various loads mounted on the fork, detecting an actual load mounted on the fork, selecting a target upright backward tilting angle corresponding to the detected load, detecting an actual upright tilt angle with respect to the neutral position vertical to the ground under unloaded condition, comparing the detected upright tilt angle with the target upright backward tilting angle, outputting an upright backward-tilting operation command signal when the detected angle is less than the target angle, an upright forward-tilting operation command signal when the detected angle exceeds the target angle, and an upright tilting-stop command signal when the detected angle is equal to the target angle, and controlling the upright tilt angle to attain or maintain the target upright backward tilting angle in response to these command signals.

To achieve the above-mentioned second object, the method of gently stopping a fork horizontal portion supported movably up and down by the upright of a fork lift truck at a position parallel with respect to the ground at relatively slow speed according to the present invention comprises the step of converting the outputted digital upright tilting operation command signals into the corresponding analog signals of forward-tilt, backward-tilt, and zero neutral position, detecting an analog signal indicative of an offset value from the neutral position at which the upright rests at a backward tilting angle, comparing the converted analog signal with the detected analog signal, outputting a clockwise motor driving signal when the converted analog signal voltage level is below the detected analog signal voltage level, a counterclockwise motor counterclockwise driving signal when the converted signal voltage level is beyond the detected signal voltage level, and controlling the upright tilt angle to attain or maintain the target upright backward tilt angle in response to the outputted motor driving signals.

To achieve the above-mentioned primary object, the system for controlling a fork horizontal portion vertically movably supported by an upright of a fork lift truck at a position parallel with respect to the ground according to loads mounted on the fork according to the present invention comprises a first potentiometer for detecting upright forward/backward tilt angles, a load sensor for detecting the load mounted on the fork, an A-D converter for converting the detected upright tilt angle signal into the corresponding analog signal, a microcomputer, a tilt control valve for switching the direction of hydraulic fluid flow, a tilt servo mechanism for controlling the tilt control valve in response to the upright forward/backward tilting operation command signals outputted from the microcomputer, in addition to a hydraulic tilt cylinder, a hydraulic lift cylinder, etc.

To achieve the above-mentioned second object, the tilt servo mechanism according to the present invention comprises a D-A converter, a second potentiometer, a comparator, a motor control unit, a servo motor, a servo motor driver, a gear wheel, an electromagnetic clutch, a tilt control valve, etc.

To achieve the third above-mentioned object, the microcomputer comprises a subroutine including the steps of comparing the current detected bit strings with the reference bit strings and producing an audible alarm to an operator if the two strings do not match.

BRIEF DESCRIPTION OF THE DRAWINGS

The features and advantages of the method and system of controlling a fork horizontal portion for a fork lift truck at a position parallel with respect to the ground under any loaded conditions according to the present invention will be more clearly appreciated from the following description of the preferred embodiments of the invention taken in conjunction with the accompanying drawings in which like reference numerals designate the same or similar elements or sections throughout the figures thereof and in which;

FIG. 14 is a list of the reference bit strings to be outputted from the A-D converter when normally operating; and FIG. 15 is a schematic block diagram of a circuit configuration of the abnormality-detecting software facility executed on the basis of the flowchart shown in FIG. 13 and incorporated in the microcomputer according to the present invention.

DETAILED DESCRIPTION OF THE PREFERRED EMBODIMENTS

To facilitate understanding of the present invention, a brief reference will be made to a conventional fork lift truck, with reference to the attached drawings.

Figure 1:
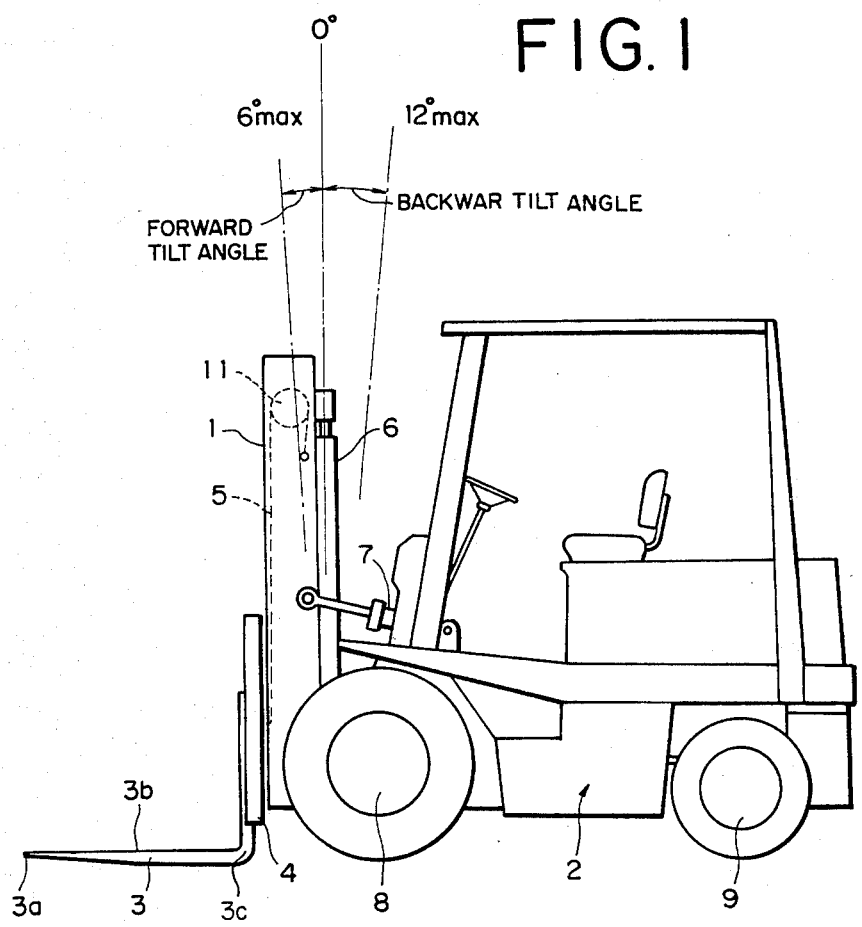
FIG. 1 is a side view of an illustrative fork lift truck.

FIG. 1 shows a diagrammatical outside view of a representative fork lift truck. In the figure, the reference numeral 1 denotes an upright including a pair of right- and left-side masts which is inclinably provided on the front surface of a fork lift truck body 2. Further, the mast includes an outer mast 1a and an inner mast 1b moved up and down along the outer mast 1a (both shown in FIGS. 2 and 3). The reference numeral 3 denotes a fork fixed to a lifting-and-lowering member 4 which can be moved up and down along the upright 1, and the reference numeral 3a denotes a free end of the horizontal portion 3b of the fork 3. The reference numeral 6 denotes a hydraulic lift cylinder for lifting or lowering the inner mast 1a and the lifting-and-lowering member 4 via a chain 5. The reference numeral 7 denotes a hydraulic tilt cylinder to tilt the upright 1 forwardly or backwardly, this tilting operation being performed by controlling a tilt control valve provided on the midway of a hydraulic pipe communicating with a tilt servo mechanism (not shown). The reference numeral 8 denotes front wheels and the reference numeral 9 denotes rear wheels.

In the fork lift truck thus constructed, the lifting height H (in FIG. 2) is usually determined on the basis of the calculations of the travel distance of the chain 5 or the number of revolution of the chain wheel 11.

Figure 2:
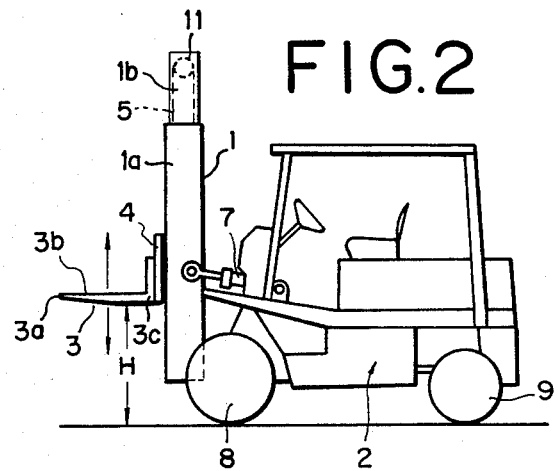
FIGS. 2 and 3 are side views of an illustrative fork lift truck provided for assistance in explaining the shortcomings of the fork lift truck.
Figure 3:
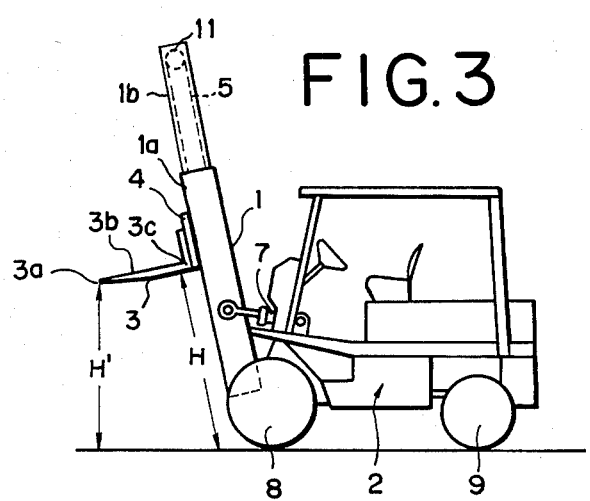

In this case, when the horizontal portion 3b of the fork 3 is parallel with respect to the ground as depicted in FIG. 2, the lifting height H of the fork horizontal portion is constant everywhere throughout the fork horizontal portion 3between the fork and the ground; however, when the upright 1 tilts forwardly from the vertical line with respect to the ground and therefore the horizontal portion 3b of the fork 3 is not parallel with respect to the ground as depicted in FIG. 3, the lifting height H' at the free end 3a of the fork does not agree with the calculated lifting height H at the fixed end 3c of the fork horizontal portion.

Figure 4:
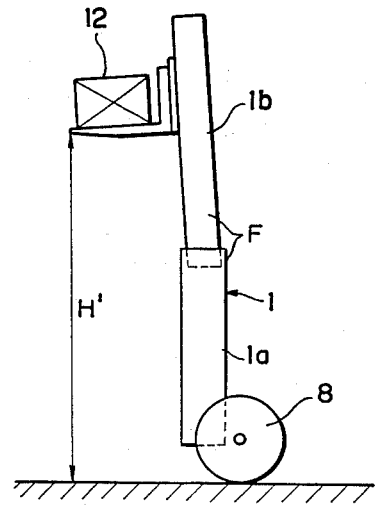
FIG. 4 is a fragmentary side view of the mast provided for the illustrative fork lift truck shown for assistance in explaining the shortcomings of the multiple mast type fork lift truck.

To overcome this problem, therefore, in the usual automatic lifting operation of the fork lift truck, the upright 1 must be first adjusted vertically with respect to the ground, and next the inner masts are lifted or lowered. However, in the case when some load is applied on the fork, the fork horizontal portion is inevitably tilted forwardly and, additionally, this forward tilting angle varies when the degree of load varies. This is because the load mounted on the fork will deform the front wheels, the mast, the fork horizontal portion, etc., especially if there exist some clearances between two connected members, for instance, between the inner mast and the outer mast, as depicted in FIG. 4.

In view of the above description, reference is now made to a first embodiment of the method and system for controlling a fork of a fork lift truck according to the present invention.

Before explaining the gist of the present invention, first the usual automatic lifting operation of a fork lift truck by the use of microcomputer will be described with reference to FIG. 5. In the figure, when the automatic lifting/lowering operation starts (block 1), first the program determines whether or not the upright is vertical with respect to the ground (block 2). If not vertical, a vertical-control operation starts for the upright and the hydraulic tilt cylinder 6 moves the upright to and fro until the upright is set vertically with respect to the ground. In this step, when the upright is set to a vertical position accurately, a signal indicative of "vertical upright" is outputted to stop the tilting operation (block 6). If the upright is vertical with respect to the ground, the automatic load lifting or lowering operation starts (block 3) Next, the program determines whether or not the lifting height reaches a target height. If not at the target height, the automatic load lifting or lowering operation is repeatedly performed. If at the target height, the operation stops (block 5).

Figure 5:
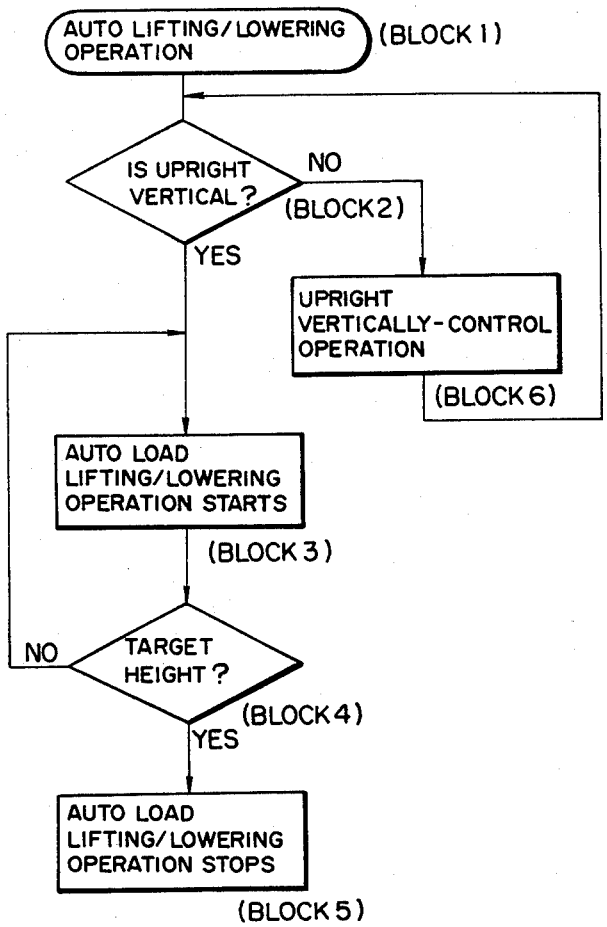
FIG. 5 is a flowchart of a representative automatic lifting operation of a fork lift truck.

The present invention is related to the step of "upright vertical-control operation" shown by block 6 in FIG. 5.

Figure 6:
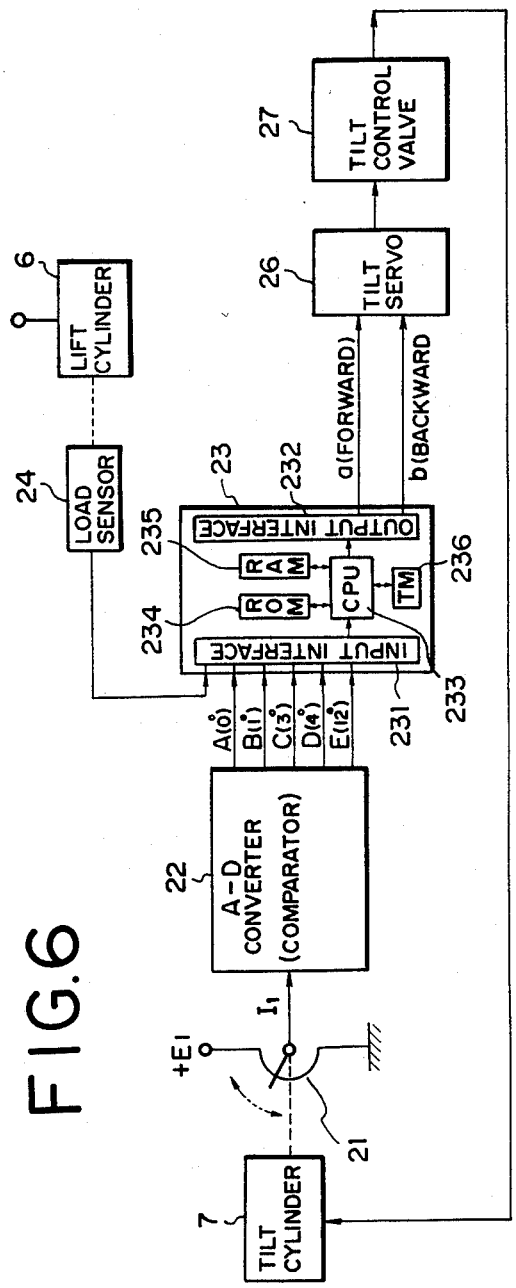
FIG. 6 is a schematic block diagram of an embodiment of the system for controlling a fork of a fork lift truck at a position parallel with respect to the ground according to the present invention, in which a microcomputer is provided.

FIG. 6 is a schematic block diagram showing the configuration of the main element of an embodiment of the system of controlling the fork horizontal portion of a fork lift truck at a position parallel with respect to the ground by the aid of a microcomputer according to the present invention.

In FIG. 6, the reference numeral 7 denotes a hydraulic tilt cylinder for adjusting the upright forwardly or backwardly by chainging the direction of hydraulic fluid, the reference numeral 21 denotes a first potentiometer mechanically linked with the hydraulic tilt cylinder 7 for generating an analog voltage signal proportional to the upright tilt angle. The reference numeral 22 denotes an A-D converter (a kind of a comparator) for converting the detected analog signal indicative of the current upright tilt angle applied from the potentiometer 21 into a plurality of binary digital signals, indicating whether or not the current upright tilt angle is in a tilt angle range, as explained in more detail hereinafter with reference to FIG. 8. The reference numeral 23 denotes a microcomputer including an input interface 231, an output interface 232, a central processing unit (CPU) 233, a read-only memory (ROM) 234, a random access memory (RAM) 235, and a timer unit 236. The reference numeral 24 denotes a load sensor or a hydraulic pressure sensor for detecting the pressure within the hydraulic lift cylinder 6. When the output signals from this sensor are analog ones, these analog signals are inputted to the CPU 233 through the input interface 231 including an analog-to-digital converter (not shown).

On the other hand, a number of data indicative of target upright backward tilt angles to be previously set for keeping the fork horizontal portion at a position parallel with respect to the ground are stored in the ROM 234 of the microcomputer 23. These target upright backward tilt angle data are previously determined on the basis of experimental results (actual measurements) in such a way that the horizontal portion of the fork supported movably up and down by the previously backwardly-tilted upright may become parallel with respect to the ground even if various loads are applied onto the fork.

For instance, when no load is mounted on the fork, the unloaded target upright backward tilt angle (unloaded neutral range) is determined to be in the range of 0 degree to 1 degree. When a first predetermined load is mounted on the fork, the first target upright backward tilt angle (the first loaded neutral range) is determined to be in the range of 1 degree to 3 degrees. When a second load is mounted on the fork, the second target upright backward tilt angle (the second loaded neutral range) is determined to be in the range of 3 degrees to 4 degrees.

In some cases, only two positions are taken into consideration; an unloaded neutral position of from 0° to 1° in upright backward tilt angle and a loaded neutral position of from 3° to 4° in upright backward tilt angle. In such case, returning back to FIG. 6, the output signals A–E from the comparator 22 are applied to a microcomputer 23. On the other hand, a hydraulic signal (digital or analog) is applied to the microcomputer 23 through a load sensor 24 for detecting the hydraulic pressure of the lift cylinder 6. The load sensor 24 determines the presence or absence of a load 12 mounted on the fork 3. Where there exists a load, the load sensor 24 turns on a switch (not shown) to apply an output signal "1" to the microcomputer 23, and where there exists no load, the load sensor 24 turns off the switch (not shown) to apply an output signal "0" to the microcomputer 23.

On the other hand, there is previously stored in the computer 23 a predetermined mast backward tilt angle range of the fork horizontal portion 3b with respect to the ground according to the load mounted on the fork 3. For instance, in the case of no load, the mast backward tilt angle of the horizontal portion 3b of the fork with respect to the ground is from 0° to 1° as an unloaded neutral position range. Further, in the case of the presence of a predetermined load, the mast backward tilt angle is from 3° to 4° as a loaded neutral position range, so that when the mast backward tilt angle lies within this range, the horizontal portion 3b of the fork is considered to be parallel with respect to the ground. These ranges are determined on the basis of experiments.

Figure 10:
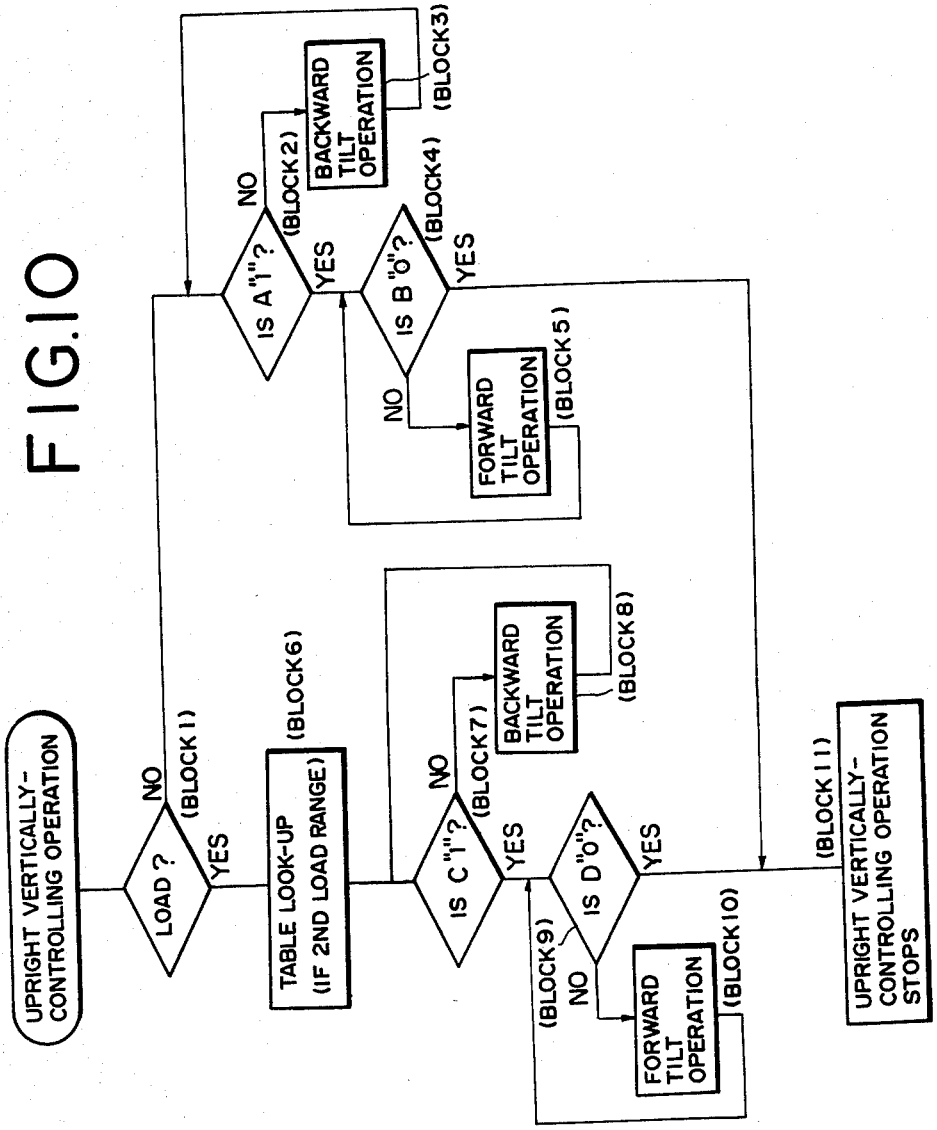
FIG. 10 is a flowchart of the method of comparing the detected digital upright tilt angle with the target upright backward tilting angle.

Therefore, the microcomputer 23 implements a programmed control for operating the upright to a vertical position with respect to the ground in accordance with the flowchart shown in FIG. 10, so that the mast backward tilt angle may lie within a predetermined range according to the predetermined load, that is, the horizontal portion 3b of the fork 3 may become parallel with respect to the ground.

Therefore, the microcomputer 23 determines whether or not the current upright backward tilt angle detected by the first potentiometer 21 lies within the predetermined neutral range corresponding to the current load and outputs to a tilt servo mechanism 26 an upright forward-tilt command signal a, when the current upright tilt angle is beyond the neutral range and, an upright backward-tilt command signal b, when the current tilt angle is below the neutral range. The tilt servo mechanism 26 controls a tilt control valve 27 so as to switch the direction of the flow of the hydraulic fluid fed from a hydraulic pump (not shown) into the hydraulic tilt cylinder 7, with the result that the upright backward tilt angle is adjusted to be within the predetermined upright backward tilting angle range.

Figure 7:
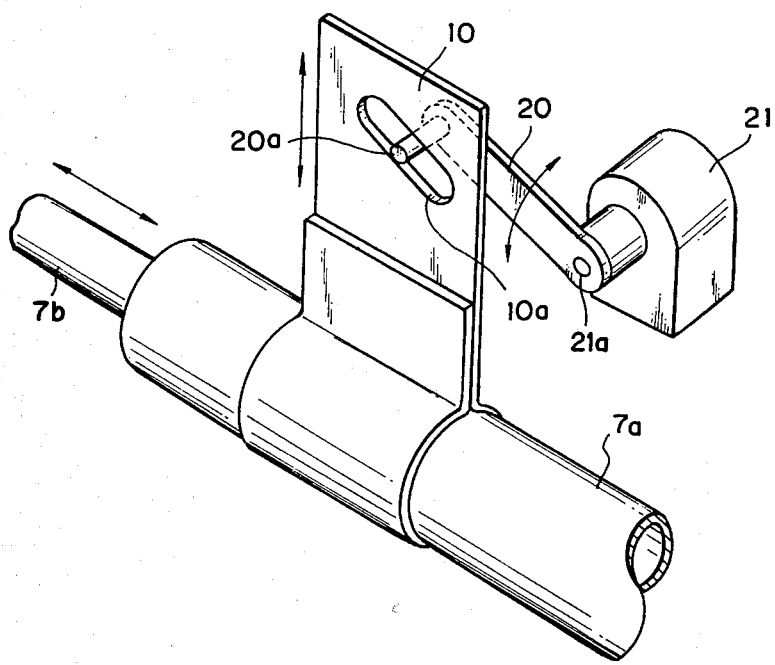
FIG. 7 is an enlarged perspective view showing an embodiment of an upright tilt angle sensor (a potentiometer) used for the fork lift truck according to the present invention.

FIG. 7 shows the structure of the first potentiometer 21. The potentiometer 21 is provided with a crank lever 20 one end of which is fixed to an axle 21a of the potentiometer 21. On the other end of the crank lever 20, a pin 20a is fixed. Further, a plate 10 having a slot 10a formed therein is fixed to the outer peripheral surface of a cylinder tube 7a. Therefore, by fitting the pin 20a into the slot 10a, the up-and-down movement of the cylinder tube 7a in order to tilt the upright can be detected by this potentiometer 21. That is to say, when the cylinder tube 7a moves up and down, the crank lever 20 rotates. Further, in FIG. 7, the reference numeral 7b denotes a cylinder rod moved to and fro within the cylinder tube 7a. When the cylinder rod 7b is moved out of the tube 7a, the upright is moved frontward, and simultaneously the tube 7a moves downward.

Therefore, when piston tube 7a moves up and down, the slot 10a rotates the crank lever 20 clockwise or counterclockwise, so that the potentiometer 21 generates an analog voltage signal corresponding to the angle displacement of the crank lever 20, that is, corresponding to the travel of the hydraulic cylinder tube 7a.

Figure 8:
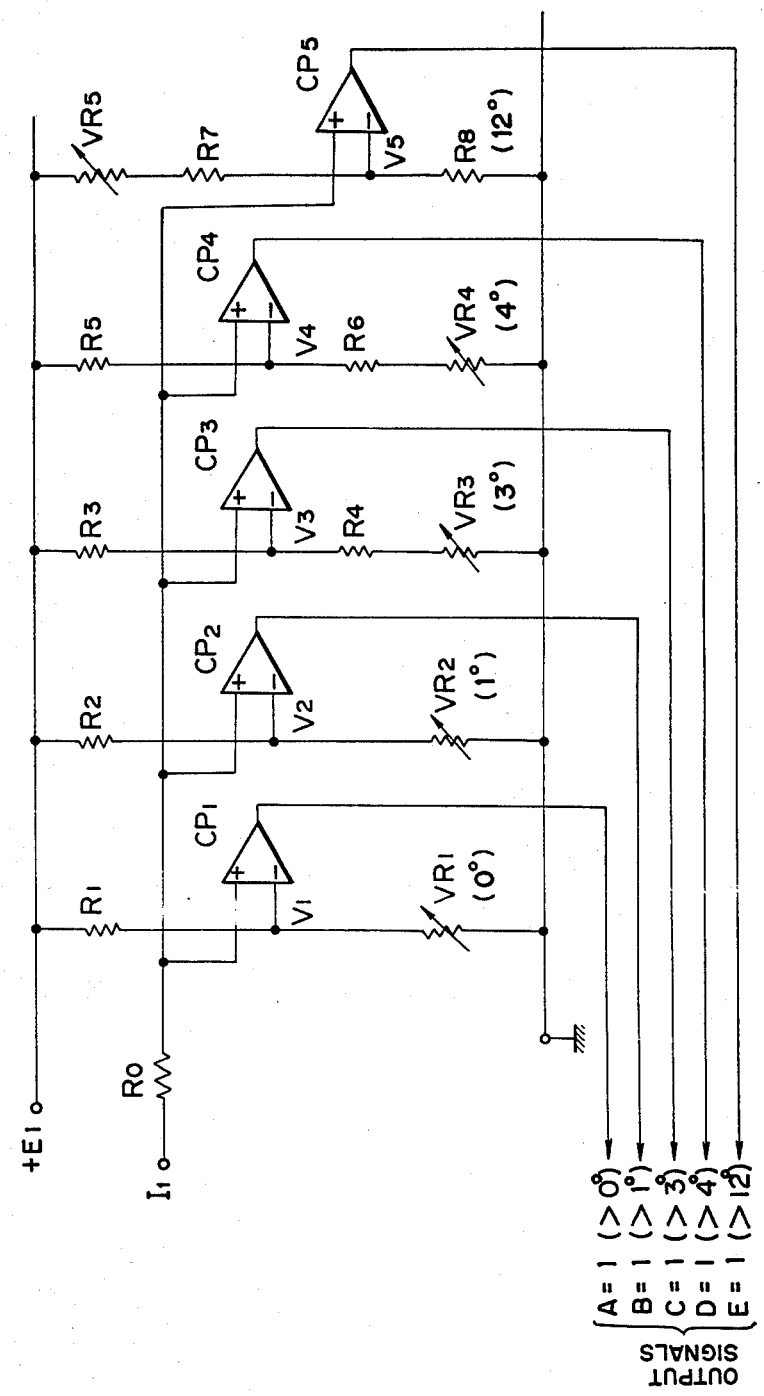
FIG. 8 is a circuit diagram of an embodiment of the A-D converter section (comparator) shown in FIG. 6.

FIG. 8 shows the circuit configuration of a sample A-D converter 22 of comparator type. In the figure, the symbol $E_1$ designates a power supply terminal to which a supply voltage is applied. The symbols $R_0$ to $R_8$ designate resistors, the symbols $VR_1$ to $VR_4$ designate variable resistors, and the symbols $CP_1$ to $CP_5$ designate comparators.

In the comparator $CP_1$, a preset voltage $V_1$ which is equal to a voltage across the first potentiometer 21 developed when the upright tilt angle is zero degrees is applied to the negative input terminal (−). This comparator $CP_1$ outputs a digital output signal A when the analog signal $I_1$ exceeds the preset voltage $V_1$. In other words, if this digital signal A is "1", this means that the upright backward tilt angle is zero degrees or more.

In the comparator $CP_2$, a preset voltage $V_2$ which is equal to a voltage across the first potentiometer 21 developed when the upright tilt angle is one degree is applied to the negative input terminal (−). This comparator $CP_2$ outputs a digital signal B when the analog signal $I_1$ exceeds the preset voltage $V_2$. In other words, if this digital signal B is "1", this means that the upright backward tilt angle is one degree or more.

Similarly, in the comparator $CP_3$, $V_3$ corresponds to a voltage when the upright tilt angle is three degrees. If this digital signal C is "1", the upright tilt angle is three degrees or more. In $CP_4$, $V_4$ corresponds to a voltage when the upright tilt angle is four degrees. If this digital signal D is "1", the upright tilt angle is four degrees or more. In $CP_5$, $V_5$ corresponds to a voltage when the angle is twelve degrees. If E is "1", the angle is twelve degrees or more.

Here, when the voltage developed across the first potentiometer increases with increasing upright backward tilt angle, the respective preset voltage must be as follows:

$$V_1 < V_2 < V_3 < V_4 < V_5$$

Figure 9:
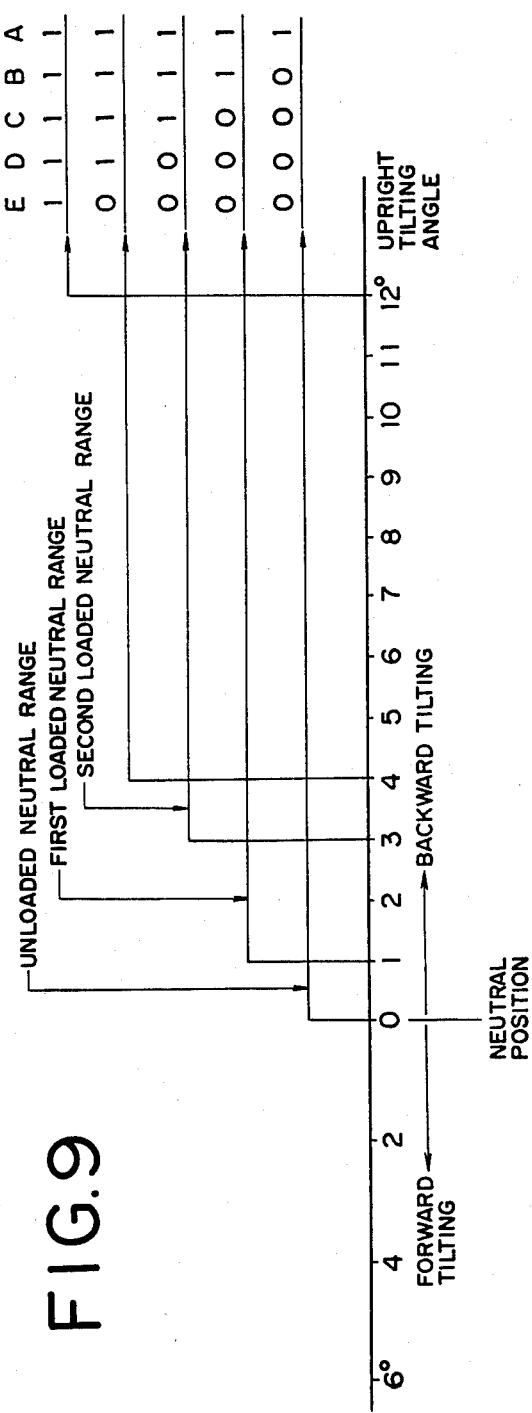
FIG. 9 is a graphical representation showing the relationship between the output signals A, B, C, D, and E outputted from the A-D converter and the upright backward tilt angles 0, 1, 2, 3, 4 and 12 degrees.

FIG. 9 clearly shows the relationship between the respective digital signals A, B, C, D and E from the A-D converter 22 and the upright backward tilt angles.

FIG. 9 indicates that if the upright backward tilt angle is in the range of 0 to 1, that is, in the unloaded neutral range, the digital signals from the A-D converter 22 are A=1, B=C=D=E=0. Similarly, if the tilt angle is in the range of 1 to 3, that is, in the first loaded neutral range, the digital signals are A=B=1, C=D=E=0. If the tilt angle is in the range of 3 to 4, that is, in the second loaded neutral range, the digital signals are A=B=C=1, D=E=0.

FIG. 10 shows a flowchart of the upright vertical-controlling operation according to the present invention. This operation relates to the steps of blocks 2 and 6 in FIG. 5. Therefore, the automatic load lifting or lowering operation (block 3, in FIG. 5) starts after this upright vertical-controlling operation stops (block 11 in FIG. 10).

In the microcomputer 23, the unloaded neutral upright tilt angle range is obtained when the digital signal A is "1" and the digital signals B, C, D, and E are all "0". The loaded neutral uplight tilt angle ranges are obtained when any of the digital signals B, C and D is "1" and the digital signal E is always "0".

The upright vertical operation will be described with reference to FIGS. 9 and 10.

In the microcomputer 23, when the upright vertically-control operation starts, first the program determines whether or not there exists a load on the fork (block 1). In the case of no load, in order to determine that the unloaded neutral range must be between 0 degrees and 1 degree, the program advances to block 2 in order to determine whether or not the digital signal A from the A-D converter 22 is "1". If not "1", that is, if "0", this means that the upright tilts forwardly. Then, the backward tilt operation starts (blocks 3), and the microcomputer 23 outputs an upright backward-tilting command signal b to the servo mechanism 26. As a result, a tilt control valve is operated to move the upright backwardly. If the digital signal A is "1", this means that the upright tilt angle is over zero degrees. After that, the program determines whether or not the digital signal B is "0". If not "0", that is, if "1", this means that the upright tilts backwardly more than 1 degrees, therefore, the frontward tilt operation starts (block 5), and the microcomputer 23 outputs an upright forward-tilt command signal a to the servo mechanism 26. If the digital signal B is "0", this means that the upright tilt angle lies between 0 degrees and 1 degree, and thus the upright vertical-control operation stops (block 11) and next the load lifting operation starts (block 3, in FIG. 5).

In the case of load, the microcomputer 23 first determines the degree of the load mounted on the fork on the basis of the output signal from the load sensor 24, and next searches an appropriate predetermined upright backward tilt angle range, according to the detected load, among the data stored in the ROM 234, that is, table look-up operation is executed in the microcomputer 23 (block 6). In this case, if the second loaded range is searched, the upright must be tilted backwardly within the range of 3 degrees to 4 degrees. Therefore, the computer 23 first determines whether or not the digital signal C from the A-D conveter 22 is "1" (block 7). If not "1", that is, if "0", this means that the upright backward tilt angle is less than 3 degrees, so that the backward tilt operation starts (block 8) and the microcomputer 23 outputs an upright backward-tilting command signal b to the servo mechanism 26. If the signal C is "1", this means that the upright backward tilt angle is more than 3 degrees. Therefore, next the program determines whether or not the digital signal D is "0" (block 9). If not "0", that is, if "1", this means that the upright backward tilt angle is more than 4 degree, so that the forward tilt operation starts (block 10) and the microcomputer 23 outputs an upright forward-tilting command signal a to the servo mechanism 26. If the signal D is "0", this means that the upright backward tilt angle is less than 4 degrees, that is, the upright tilt angle lies between 3 degrees and 4 degrees and thus the upright vertically-controlling operation stops (block 11), outputting an upright neutral position signal.

In this embodiment described above, although the upright neutral ranges are divided into several ranges in accordance with the degree of load mounted on the fork, it is of course possible to store into the ROM a function of the upright neutral angle (target upright backward tilting angles) in accordance with the degree of various load. In this case, the neutral angle range is automatically set continuously, even if the load varies continually or continuously. In this case, the larger the load, of course, the greater the upright backward tilting angle.

As described above, when the fork horizontal portion becomes horizontal on the basis of the above-mentioned upright vertical-control operation and the operation stops, the microcomputer 23 generates a command signal to lift or lower the fork. In response to this signal, the fork lift truck starts an automatic load lifting or lowering operation. When this automatic lifting or lowering operation stops, the lifting height calculated on the basis of the travel of the chain to move the fork up and down agrees with the actual lifting height at the fork free end, thus it is possible to obtain an accurate upright stop position in the automatic fork lifting/lowering operation, even if the load on the fork deforms the front wheel, the masts, the fork horizontal portion, etc.

Next, the second object of the present invention will be described hereinbelow with reference to FIGS. 11 and 12.

When the microcomputer 23 detects the upright neutral position command signal, that is, the upright is adjusted to the target backward tilting angle, the microcomputer 23 turns off both the power supplies to the tilt servo mechanism 26 for driving the tilt control valve 27 and an electromagnetic clutch 56 (explained later) to engage or disengage a servo motor 54 with or from the tilt control valve 27. Therefore, the spring-urged tilt control valve returns abruptly to the neutral position due to the force of a spring to momentarily close the tilt control valve fully, as a result, the upright is stopped abruptly at its vertical position with respect to the ground. This causes another problem in that a shock is applied to the load mounted on the fork and thereby there is a danger that the load may be moved or thrown out of the fork, whenever the upright is stopped abruptly.

To overcome these problems, in the embodiment according to the present invention, the upright is adjusted gradually to the target tilt angle at a low speed when the microcomputer outputs the upright tilt operation command signals. In more detail, an offset value from the current neutral position at which the upright rests is first detected by a second potentiometer; a servo motor to actuate the tilt control valve is controlled so as to be driven in proportion to the detected offset value. In other words, the servo motor rotates at a high speed when the upright tilt angle to be adjusted is large, and at a low speed when the upright tilt angle to be adjusted is small.

Further, in this embodiment, there are provided a timer and an electromagnetic clutch. Therefore, after having been adjusted to a position at which the upright is set at the target backward tilting angle, the tilt control valve is released by the electromagnetic clutch from the servo motor into the next valve neutral position at which the valve is fully closed. This clutch is deenergized in response to a signal outputted from the microcomputer a fixed time period after the upright neutral position command signal has been generated within the microcomputer.

Figure 11:
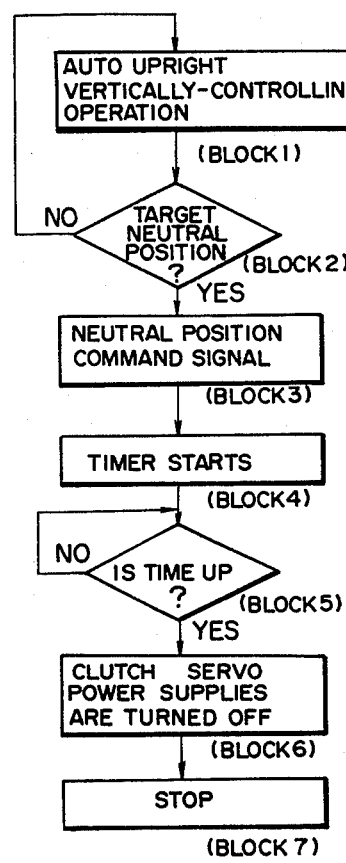
FIG. 11 is a flowchart of the method of slowly stopping a fork for a fork lift truck at a position parallel with respect to the ground, without a shock, according to the present invention.

With reference to FIG. 11, there is described the sequence of the automatic upright vertical-control operation.

As shown in the flowchart of FIG. 11, when the automatic upright vertical-control operation starts (in block 1), the microcomputer 23 determines whether or not the upright is at the neutral position on the basis of the digital signals A-D from the A-D converter, that is, the comparator 22 (in block 2). If not at the target neutral position, the automatic upright vertical-control operation is performed continuously returning back again to block 1. If at the target neutral position, the microcomputer 23 outputs a neutral position command signal indicative of zero opening percentage to the servo motor (in block 3).

On the other hand, the microcomputer 23 starts the timer (in block 4). In this embodiment, the timer is, for instance, an IC timer or a software timer. After a predetermined time period has elapsed (in block 5), the microcomputer 23 cuts off the power supply to the electromagnetic clutch 56 and the servo motor driving circuit 64 for operating the tilt control valve 27 (in block 6). Therefore, the spring-urged tilt control valve 27 returns to the neutral position due to the force of the spring, the tilt control valve is fully closed, so that the tilt operation is completely stopped (in block 7).

Figure 12:
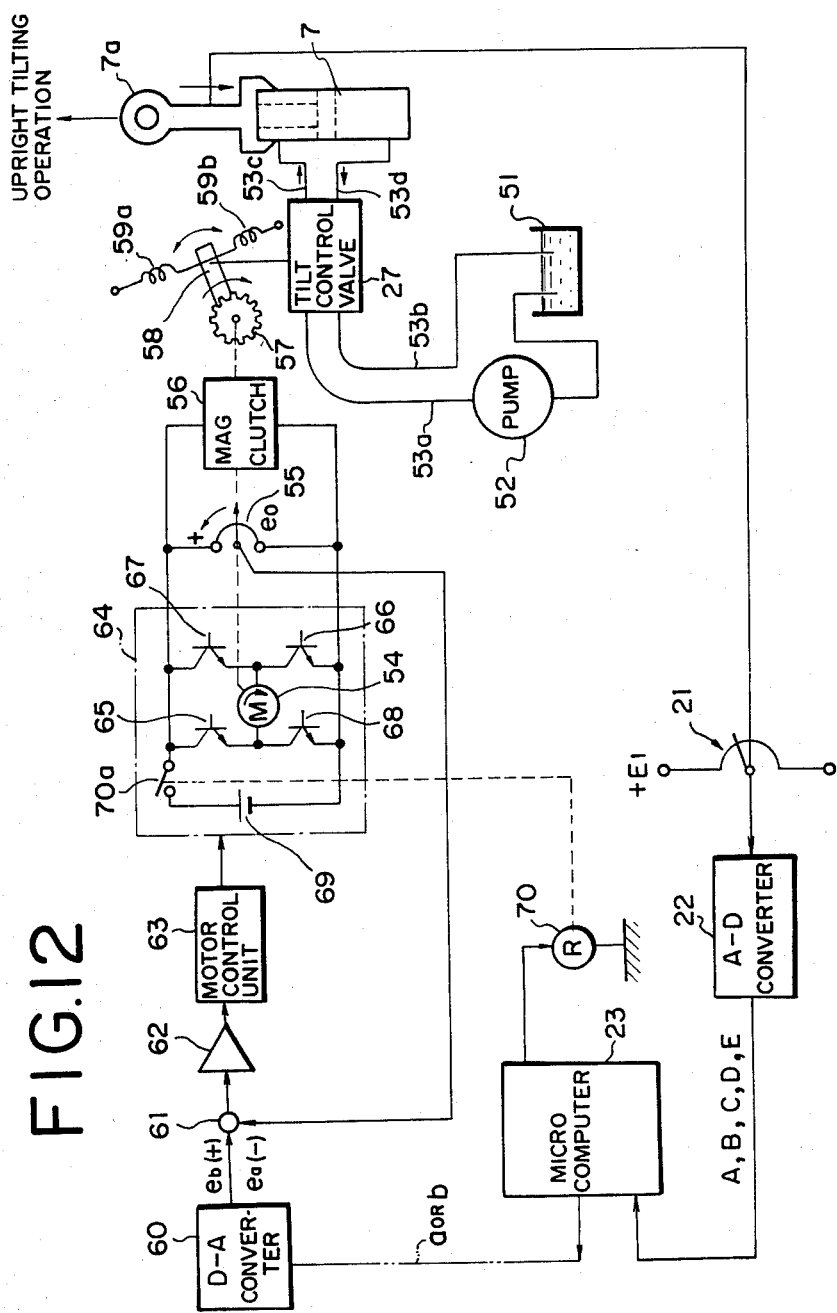
FIG. 12 is a schematic block diagram according to the present invention, including a diagrammatical illustration of an embodiment of the system of slowly stopping the fork for a fork lift truck at a position parallel with respect to the ground without shock.

Now follows a description of the actual system configuration and the operation of the flowchart, with reference to FIG. 12.

FIG. 12 shows an embodiment of the fork lift truck according to the present invention, in which the tilt servo mechanism is diagramatically illustrated. In FIG. 12, the reference numeral 51 denotes an oil tank, the reference numeral 52 denotes an oil pump, the reference numeral 27 denotes a tilt control valve, the reference numeral 53 (53a-53d) denotes hydraulic fluid communicating pipes, in which the numeral 53a denotes a supply pipe and the numeral 53b denotes a drain pipe. The reference numeral 54 denotes a servo motor, the reference numeral 55 denotes a second feedback potentiometer linked with the servo motor 54, the reference numeral 56 denotes an electromagnetic clutch linked with the servo motor 54, the reference numeral 57 denotes a gear wheel driven by the servo motor 54 when the electromagnetic clutch 56 engages the servo motor 54 therewith, and the reference numeral 58 denotes a lever fixed to the axle of the gear wheel 57. This lever 58 is fixed to one ends of springs 59a and 59b, and the other ends of these springs are also fixed. A spool for controlling the opening and closing of the valve communicating with the pipes 53c and 53d is disposed within the tilt control valve 27, and this spool is linked with the lever 58.

The reference numeral 60 denotes a D-A converter for converting the upright forward tilt operation command signal a and the upright backward tilt operation command signal b generated from the microcomputer 23 into an appropriate analog voltage signal. The reference numeral 61 denotes a comparator circuit for checking the difference between the analog signal outputted from the D-A converter 60 and the voltage developed across the feedback potentiometer 55 which rotates together with the gear wheel and for generating a positive or negative differential voltage signal, and the reference numeral 62 denotes an amplifier, the reference numeral 63 denotes a motor control unit, which outputs no signal when the signal from the amplifier 62 lies within a predetermined positive or negative range, that is, within the neutral range, a signal to turn on the transistors 65 and 66 in the servo motor driving circuit 64 when the signal from the amplifier 62 is beyond the predetermined positive range, and another signal to turn on the transistors 67 and 68 in the servo motor driving circuit 64 when the signal from the amplifier 62 is beyond the predetermined negative range. The reference numeral 69 denotes a DC power supply, and the reference numeral 70 denotes a relay coil the power supply of which is supplied via the microcomputer 23. The numeral 70a denotes a relay contact closed or opened when the relay coil 70 is energized or deenergized.

Now follows a description of the operation. When the power supply of the microcomputer 23 is turned on, the relay coil 70 is energized, so that the relay contact 70a is closed. Therefore, the servo motor driving circuit 64 is activated and the electromagnetic clutch 56 is energized to engage the servo motor 54 with the gear wheel 57. In this embodiment, the second feedback potentiometer 55 is mechanically linked with the gear wheel 57 so as to rotate together with the gear wheel 57.

Here, the case is explained in which the digital upright backward tilting command signal b is outputted from the microcomputer 23 to the D-A converter 60. The D-A converter 60 outputs an analog upright backward tilting command signal corresponding to the digital signal b. Since this analog command signal voltage level $e_b$ is set so as to be higher than the voltage $e_o$ developed across the second feedback potentiometer 55 (in this case the potentiometer 55 linked with the gear wheel 57 is released at the neutral position), the comparator 61 compares these two signals $e_b$ and $e_o$ and outputs a positive signal $(e_b-e_o)<0$. This differential signal is inputted to the motor control unit 63 via the amplifier 62 in order to tilt the upright backward. That is to say, the motor control unit 63 outputs a signal to turn the transistors 65 and 66 on. By this, the servo motor 54 rotates clockwise (in the arrow direction in FIG. 12). Since the servo motor 54 is engaged with the gear wheel 57 by the electromagnetic clutch 56, the gear wheel 57 also rotates clockwise (in the arrow direction in FIG. 12); the spring 59b is contracted, the spring 59a is extended. Therefore, the lever 68 pushes down the spool within the tilt control valve 27 and thereby hydraulic pressure is applied from the oil pressure pump 52 into the hydraulic tilt cylinder 7 via the pipe 53c, and is released from the hydraulic tilt cylinder 7 into the oil tank 51 via the pipe 53d, with the result that the piston of the cylinder 7 is lowered in the figure. By this operation, the upright 1 is tilted backward.

During this upright backward tilting operation, since the second potentiometer 55 also rotates together with the gear wheel, the voltage across the potentiometer 55 also increases, so that the voltage level of the differential signal $(e_b-e_o)$ outputted from the comparator 61 decreases. In the motor driving circuit 64, since the transistors 65 and 66 are so configured as to function as a DC amplifier, the collector current flowing through the transistors 65 and 66 decreases with decreasing voltage level of the differential signal from the motor control unit 63, with the result that the servo motor is driven at a slower response speed. The more the upright is tilted backward, the less the motor speed. When the differential signal voltage level reaches zero (for instance, when the upright is tilted backward by one degree), the servo motor 54 stops rotating.

As described above, when the upright 1 is adjusted to the target upright backward tilting angle, this angle is detected by the first potentiometer 21 and is checked in the microcomputer 23. In this case, since the microcomputer 23 outputs the upright neutral position command signal to a timer 236 provided within the microcomputer 23, the timer starts counting the clock pulses generated by a clock signal generator (not shown). After a predetermined time period has elapsed, the timer 236 outputs a command signal to the relay 70 in order to return the servo mechanism to the neutral position. Therefore, the relay 70 is deenergized and thereby the power supply to the servo mechanism is turned off. As a result, the electromagnetic clutch 56 disengages the servo motor 54 from the gear wheel 57. Therefore, the gear wheel lever 58, that is, the tilt control valve is released to the neutral position, at which the valve is fully closed, by the force of the two springs 59a and 59b. In this case, the second potentiometer 55 is also reset to the neutral position.

Next, the case is explained in which the digital upright forward tilting command signal a is outputted from the microcomputer 23 to the D-A converter 60. The D-A converter 60 outputs an analog upright forward tilting command signal corresponding to the digital signal a. Since this analog command signal voltage level $e_a$ is set so as to be smaller than the voltage $e_o$ developed across the second feedback potentiometer 55 (in this case the potentiometer 55 linked with the gear wheel 57 is released at the neutral position), the comparator 61 compares these two signals $e_a$ and $e_o$ and outputs a negative signal $(e_a-e_o)<0$. This differential signal is inputted to the motor control unit 63 via the amplifier 62 in order to tilt the upright forward. That is to say, the motor control unit 63 outputs a signal to turn the transistors 67 and 68 on. By this, the servo motor 54 rotates counterclockwise (in the direction opposite to the arrow in FIG. 12). Since the servo motor 54 is engaged with the gear wheel 57 by the electromagnetic clutch 56, the gear wheel 57 also rotates counterclockwise (in the direction opposite to the arrow in FIG. 12); the spring 59a is contracted; the spring 59b is extended. Therefore, the lever 68 pulls up the spool within the tilt control valve 27 and thereby hydraulic pressure is applied from the oil pressure pump 52 into the hydraulic tilt cylinder 7 via the pipe 53d and is released from hydraulic tilt cylinder 7 into the oil tank 51 via the pipe 53c, with the result that the piston of the cylinder 7 is lifted in the figure. By this operation, the upright is tilted forward.

During this upright forward tilting operation, since the second potentiometer 55 also rotates together with the gear wheel, the voltage across the potentiometer 55 also decreases, so that the absolute voltage level of the differential signal ($e_a - e_o$) outputted from the comparator 61 decreases. In the motor driving circuit 64, since the transistor 67 and 68 are so configured as to function as a DC amplifier, the collector current flowing through the transistors 67 and 68 decreases with decreasing voltage level of the differential signal from the motor control unit 63, with the result that the servo motor is driven at a slow response speed. The more the upright is tilted forward, the less the motor speed. When the differential signal voltage level reaches zero (for instance, when the upright is tilted forward by one degree), the servo motor 54 stops rotating.

As described above, when the upright 1 is adjusted to the target upright backward tilt angle, this angle is detected by the first potentiometer 21 and is checked in the microcomputer 23. In this case, since the microcomputer 23 outputs the upright neutral position command signal to the timer 236 provided within the microcomputer 23, the timer starts counting the clock pulses generated by the clock signal generator (not shown). After a predetermined time period has elapsed, the timer 236 outputs a command signal to the relay 70 in order to return the servo mechanism to the neutral position. Therefore, the relay 70 is deenergized and thereby the power supply to the servo mechanism is turned off. As a result, the electromagnetic clutch 56 disengage the servo motor 54 from the gear wheel 57. Therefore, the gear wheel 58, that is, the tilt control valve is released to the neutral position, at which the valve is fully closed, by the force of the two springs 59a and 59b. In this case, the second potentiometer 55 is also reset to the neutral position.

Further, in this invention, since there exists a time lag (a delay time) from the time when the upright neutral position command signal is generated to the time when the upright stops perfectly, and therefore since there exists a danger that, due to this time lag, the upright may not stop perfectly at a position over the desired stop position, the A-D converter 22 is preset in such a way that the neutral position command signal is outputted when the upright reaches a position a little before the position at which the upright is required to stop, in order to improve the accuracy of the upright stop position.

As described above, in the tilt servo mechanism according to the present invention, when the upright reaches the loaded neutral position, the tilt control valve is opened or closed at slow speed, no shock is applied to the load mounted on the fork, thus preventing the load from being moved or thrown out of the fork.

Next, the third object of the present invention will be described hereinbelow with reference to FIGS. 13, 14 and 15.

Figure 13:
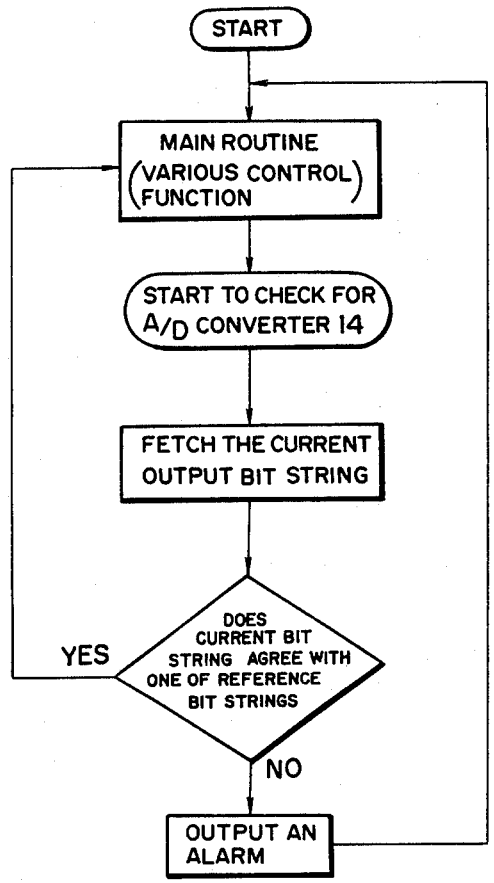
FIG. 13 is a flowchart of the method of detecting erroneous bit strings outputted from the A-D converter.

FIG. 13 shows a flowchart of the microcomputer operation for detecting whether or not the analog-to-digital converter 22 operates normally according to the present invention.

First, as shown in FIG. 14 all bit strings that are outputted if the analog-to-digital converter 22 operates normally are set respectively in such an order as E, D, C, B, and A. The bit strings described above are used as reference values REF 1 through REF 6 to be compared thereafter with the actual bit strings outputted from the analog-to-digital converter 22 shown in FIG. 6. For instance, the reference value 2 indicates that the output signals E, D, C, and B from the A-D converter 22 are "0" and the output signal A is "1".

In the processing flowchart shown in FIG. 13, the microcomputer starts to check for a failure in the analog-to-digital converter 22, and subsequently one of the bit strings presently outputted from the analog-to-digital converter 22 is compared with each of the reference bit strings REF 1 through REF 6 to check whether or not the two bit strings agree. If the bit string presently outputted from the analog-to-digital converter 22 coincides with any one of the reference bit strings shown by FIG. 14, the routine returns to an original main routine for performing various control functions. If they do not agree, the routine goes to a processing step in which an alarm is produced for warning an operator that there is an electrical abnormality in the analog-to-converter 22.

FIG. 15 shows a hardware conception of an abnormality detection facility to check for the presence of an electrical abnormality in the analog-to-digital converter 22.

In FIG. 15, a plurality of digital (bit string) comparators 117 through 122 equal in number to the reference bit strings are provided for comparing a bit string (presently outputted from the analog-to-digital converter 22 into the CPU 233) with any one of the reference bit strings REF 1 through REF 6, and all output voltage signals of the digital comparators 117 through 122 are applied to the respective input terminals of an AND gate circuit 124. If the analog-to-digital converter 22 operates normally, the bit string of the output signals A through E will agree with any one of the reference bit strings REF 1 through REF 6. In this case, the output bit signal of the AND gate circuit 124 indicates "0", because any one of the digital comparators 117 through 122 outputs a "0" bit signal indicating that the actual bit string agrees with any one of the reference bit strings. Consequently, an alarm for warning the operator that there is an abnormality in the analog-to-digital converter 22 is not produced. Conversely, if the analog-to-digital converter 22 does not operate normally, the present bit string of the output signals A through E will agree with none of the reference bit strings shown by FIG. 14. In this case, the output bit signal of the AND gate circuit 124 outputs "1", since none of the digital comparators 117 through 122 outputs a "0" bit signal. Therefore, the operator can readily notice the defective analog-to-digital converter 22 depending upon the alarm produced from the microcomputer.

In this way, according to the present invention, since there is provided in the microcomputer used with the fork lift truck control system an abnormality detection facility for detecting a defective analog-to-digital converter, the fork lift truck control system can perform correct control of the backward tilting angle of the upright constantly without accident.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of controlling a fork movably supported by an upright of a fork lift truck to attain, by means of a microcomputer, a position parallel with respect to the ground according to loads mounted on the fork, which comprises the steps of:

(a) predetermining target upright backward tilting angles according to various loads mounted on the fork for keeping the fork parallel with respect to the ground;
(b) storing the predetermined target upright backward tilting angles into a memory of the microcomputer;
(c) detecting an actual load mounted on the fork;
(d) selecting a target upright backward tilting angle stored in the microcomputer memory corresponding to the detected actual load;
(e) detecting an actual upright tilt angle with respect to a neutral position vertical to the ground;
(f) comparing the detected actual upright tilt angle with the stored target upright backward tilting angle;
(g) outputting an upright backward tilting operation command signal when the detected actual upright tilt angle is less than the stored target upright backward tilting angle, outputting an upright forward tilting operation command signal when the detected actual upright tilt angle is greater than the stored target upright backward tilting angle, and outputting an upright neutral position command signal when the detected actual upright tilt angle is equal to the stored target upright backward tilting angle; and
(h) adjusting the upright position in response to the outputted upright tilting operation command signals to provide an actual upright tilt angle substantially equal to the target upright backward tilting angle,
whereby the fork of the fork lift truck is kept parallel with respect to the ground.

2. A method of controlling a fork movably supported by an upright of a fork lift truck to attain, by means of a microcomputer, a position parallel with respect to the ground according to loads mounted on the fork as set forth in claim 1, wherein the stored target upright backward tilting angles predetermined as a function of various loads moounted on the fork are stored into the memory of the microcomputer being divided into a number of tilting angle ranges according to the load on the fork.

3. A method of controlling a fork movably supported by an upright of a fork lift truck to attain, by means of a microcomputer, a positon parallel with respect to the ground according to loads mounted on the fork as set forth in claim 2, wherein the step of comparing the detected actual upright tilt angle with the stored target upright backward tilting angle comprises the steps of:
(a) outputting an analog voltage signal representative of a detected actual upright tilt angle;
(b) comparing the outputted analog voltage signal level with a number of predetermined fixed voltage levels corresponding to a number of predetermined upright backward tilting angles;
(c) outputting first signals indicating that the detected actual upright tilt angle is beyond the predetermined upright backward tilting angles when the outputted analog voltage signal level is higher than the predetermined fixed voltages, and second signals indicating that the actually detected upright tilt angle is below the predetermined stored upright backward tilting angles when the outputted analog voltage signal level is lower than the predetermined fixed voltage; and
(d) determining a detected upright backward tilt angle to lie within one of the predetermined tilting angle ranges on the basis of a number of outputted binary signals in such a way that the detected angle lies between the largest angle indicating a second signal and the lowest angle indicating a first signal.

4. A method of controlling a fork movably supported by an upright of a fork lift truck to attain, by means of a microcomputer, a position parallel with respect to the ground according to loads mounted on the fork as set forth in claim 1, wherein the step of adjusting the actual upright tilt angle to the target upright backward tilting angle in response to the outputted upright tilting operation command signals comprises the steps of:
(a) converting the outputted digital upright forward or backward tilting operation command signal into an analog upright forward or backward command signal $e_a$ or $e_b$ corresponding thereto;
(b) detecting an analog signal $e_o$ indicative of the current upright neutral position at which the upright rests at a current backward tilting angle;
(c) comparing the converted analog upright tilting operation command signal voltage level $e_a$ or $e_b$ with the detected analog signal voltage level $e_o$;
(d) outputting a motor clockwise-driving signal having a voltage level which is proportional to a difference in voltage levels between the two signals $e_b$ and $e_o$ when the converted analog upright backwrd tilting operaton command signal voltage level $e_b$ is higher than the detected analog signal voltage level $e_o$, and a motor counterclockwise-driving signal having a voltage level which is proportional to the difference in voltage levels between the two signals $e_a$ and $e_o$ when the converted analog upright forward tilting operation command signal volltage level $e_a$ is lower than the detected signal voltage level $e_o$;
(e) controlling the directions of flow and the amount of flow of a hydraulic fluid in response to the outputted motor clockwise or counterclockwise driving signal; and
(f) adjusting the upright by the movement of the controlled hydraulic fluid to provide an actual upright tilt angle substantially equal to the target upright backward tilting angle,
whereby the upright is adjusted by analog circuitry to the target backward tilting angle at a slow speed without applying a shock to the upright.

5. A system of controlling a fork movably supported by an upright of a fork lift truck to attain, by means of a microcomputer, a position parallel with respect to the ground according to loads mounted on the fork as set forth in claim 4, wherein said step of controlling the directions of flow comprises the further steps of:
(a) determining approach of the upright to its target position by a decreased voltage level in said motor driving signals; and
(b) controlling the speed of the motor in accordance with the voltage level of said motor driving signals,
thereby to reduce the motor speed as the upright reaches its target tilting angle.

6. A system for controlling a fork movably supported by an upright of a fork lift truck attain a position parallel with respect to the ground, according to loads mounted on the fork, which comprises;
(a) a hydraulic tilt cylinder (7) for adjusting the vertical position of the upright;

(b) a hydraulic lift cylinder (6) for lifting or lowering the fork;

(c) a first potentiometer (21) mechanically linked with said hydraulic tilt cylinder for detecting upright forward or backward tilt angles and for outputting signals ($I_1$) corresponding thereto;

(d) a load sensor (24) mechanically linked with said hydraulic lift cylinder for detecting the load mounted on the fork and for outputting signals corresponding thereto;

(e) an A-D converter (22) connected to said first potentiometer for converting the analog signal indicative of upright tilt angle into the digital signal corresponding thereto;

(f) a microcomputer (23) including:

(1) an input interface (231) connected to said A-D converter for inputting the converted digital tilt angle signals into said microcomputer, and connected to said load sensor for converting the detected analog load signals into the corresponding digital load signals and inputting the signals into said microcomputer;

(2) a RAM (235);

(3) a ROM (234) for storing preestablished program sequences and target upright backward tilting angles to be previously set for keeping the fork parallel with respect to the ground according to various loads mounted on the fork;

(4) a CPU (233) for selecting a target upright backward tilting angle from among the ones stored in said ROM in accordance with the detected digital load signal, comparing the detected digital upright backward tilt angle with the selected target upright backward tilting angle, and outputting an upright forward tilting operation command signal a when the detected upright backward tilt angle is beyond the selected target upright backward tilt angle, an upright backward tilting operation command signal b when the detected upright backward tilt angle is below the selected target upright backward tilt angle, and an upright neutral position command signal when both the angles are equal to each other;

(5) an output interface (232) for outputting the upright tilting command signals a or b from the microcomputer;

(g) a tilt control valve (27) connected between said microcomputer and said hydraulic tilt cylinder for switching the direction of flow of hydraulic fluid supplied into said hydraulic tilt cylinder in order to tilt the upright backward or forward in response to the upright forward/backward tilting command signals a and b outputted from said microcomputer.

7. A system for controlling a fork fixed movably supported by an upright of a fork lift truck at a position parallel with respect to the ground, according to loads mounted on the fork, as set forth in claim 6 which further comprising a tilt servo mechanism (26) connected between said microcomputer and said tilt control valve, including:

(a) a D-A converter (60) connected to said microcomputer for converting the digital upright forward tilting operation command signal a and the digital upright backward tilting operation command signal b into the respective analog signals $e_a$ or $e_b$ corresponding thereto;

(b) a second feedback potentiometer (55) for detecting an analog signal $e_o$ indicative of the upright neutral position at which the upright rests at a current backward tilting angle;

(c) a comparator (61) connected to said D-A converter and said second feedback potentiometer for comparing the voltage level of the converted analog upright forward or backward tilting operation command signal a or b outputted from said microcomputer with the voltage level of the analog signal $e_o$ detected by said second feedback potentiometer;

(d) a motor control unit (63) connected to said comparator for ouputting a motor clockwise-driving signal the voltage level of which is proportional to the difference in voltage level between the two signals $e_b$ and $e_o$ when the converted analog upright backward tilting operation command signal voltage level $e_b$ is higher than the detected analog signal voltage level $e_o$ and a motor counterclockwise-driving signal the voltage level of which is proportional to the difference in voltage level between the two signals $e_a$ and $e_o$ when the converted analog upright forward tilting operation command signal voltage level $e_a$ is lower than the detected signal voltage level $e_o$;

(e) a servo motor (54);

(f) a servo motor driver (64) connected to said servo motor and said motor control unit for driving said servo motor clockwise or counterclockwise in response to one of the motor clockwise/counterclockwise-driving signals outputted from said motor control unit in such a way the motor driving current is proportional to the difference in voltage between the command signal $e_a$ or $e_b$ and the detected signal $e_o$;

(g) a gear wheel (57) spring-urged to a neutral position when released, being linked with said second feedback potentiometer;

(h) an electromagnetic clutch (56) for mechanically engaging said servo motor with said gear wheel when actuated for a given period by a timer signal applied from said microcomputer and disengaging said servo motor from said gear wheel when deactuated;

(i) a tilt control value (27) mechanically linked with said gear wheel for feeding hydraulic fluid into said hydraulic tilt cylinder in such a direction that said upright is tilted backward when said servo motor rotates clockwise or in such a direction that said upright is tilted forward when said servo motor rotates counterclockwise, said tilt control value being released to its neutral position at which the hydraulic fluid is not fed in either direction by said spring-urged gear wheel when said gear wheel is disengaged from said servo motor, that it, when said electromagnetic clutch is deactuated;

whereby the upright is controlled to the target tilting angle at a relatively slow speed.

8. A system of controlling a fork movably supported by an upright of a fork lift truck, attain a position parallel with respect to the ground, according to loads mounted on the fork, as set forth in claim 6, wherein the target upright backward tilting angles to be previously set according to various loads mounted on the fork are stored in said ROM being divided into a number of tilting angle ranges according to the load on the fork.

9. A system for controlling a fork movably supported by an upright of a fork lift truck to attain, by means of a microcomputer, a position parallel with respect to the ground according to loads mounted on the fork as set forth in claim 8, wherein said A-D converter comprises a plurality of comparator circuits each having positive and negative input terminals and an output terminal, the positive input terminals of which are connected to said first potentiometer for receiving the detected upright forward or backward tilt angle signal, the negative input terminals of which are preset in such a way that a number of predetermined fixed voltage levels corresponding to a number of predetermined upright backward tilting angles are applied to the negative input terminals, the output terminals of which are connected to said microcomputer, said comparator circuits outputting first signls indicating that the detected upright tilt angle is beyond the predetermined upright backward tilting angles when the voltage signal is higher than the predetermined fixed voltage levels and second signals indicating that the detected upright tilt angle is below the predetermined upright backward tilting angles when the voltage signal is lower than the predetermined fixed voltage levels.

10. A system of controlling a fork movably supported by an upright of a fork lift truck to attain, by means of a microcomputer, a position parallel with respect to the ground according to loads mounted on the fork as set forth in claim 6, wherein said microcomputer determines that the detected upright backward tilt angle lies within one of a plurality of predetermined tilting angle ranges on the basis of a plurality of binary signals outputted from said A-D converter in such a way that the detected angle lies between the largest angle represented by a first binary signal level and the lowest angle represented by a second binary signal level.

11. A system for controlling a fork movably supported by an upright of a fork lift truck at a position parallel with respect to the ground, according to loads mounted on the fork, as set forth in claim 6, wherein said microcomputer further comprises:

(a) an abnormality detection circuit incorporated in said input interface for comparing the bit string presently outputted from said A-D converter with one of the predetermined reference bit strings and generating an alarm signal when the bit string presently outputted from said A-D converter does not agree with any one of the predetermined reference bit strings, each predetermined reference bit string corresponding to one of the bit strings outputted from said A-D converter which operates normally;

(b) an alarm circuit connected to said abnormality detection circuit for producing an alarm in response to the alarm signal generated from said abnormality detection circuit.

12. A system for controlling a fork movably supported by an upright of a fork lift truck at a position parallel with respect to the ground, according to loads mounted on the fork, as set forth in claim 11, wherein said abnormality detection circuit comprises:

(a) a plurality of bit-string comparators connected to said A-D converter for comparing the bit string presently outputted from said A-D converter with any one of the predetermined reference bit strings and outputting a "1" bit signal respectively, when the present bit string does not agree with any one of the reference bit strings; and (b) an AND gate the input terminals of which are connected to the output terminals of said bit-string comparators and the output terminal of which is connected to said alarm circuit, for outputting an alarm signal when all of said bit-string comparators output "1" bit signals.

* * * * *